(12) United States Patent
Abuto et al.

(10) Patent No.: US 12,442,139 B2
(45) Date of Patent: Oct. 14, 2025

(54) ABSORBENT ARTICLES AND METHODS FOR MANUFACTURING SAME

(71) Applicant: Kimberly-Clark Worldwide, Inc., Neenah, WI (US)

(72) Inventors: Francis P. Abuto, Johns Creek, GA (US); Andrew T. Baker, Norcross, GA (US); Marvin E. Swails, Alpharetta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 239 days.

(21) Appl. No.: 17/770,999

(22) PCT Filed: Oct. 21, 2020

(86) PCT No.: PCT/US2020/056607
§ 371 (c)(1),
(2) Date: Apr. 21, 2022

(87) PCT Pub. No.: WO2021/081057
PCT Pub. Date: Apr. 29, 2021

(65) Prior Publication Data
US 2022/0380985 A1  Dec. 1, 2022

Related U.S. Application Data

(60) Provisional application No. 62/923,826, filed on Oct. 21, 2019.

(51) Int. Cl.
*D21H 27/38*  (2006.01)
*A47K 10/16*  (2006.01)
(Continued)

(52) U.S. Cl.
CPC ............. *D21H 27/38* (2013.01); *A47K 10/16* (2013.01); *B32B 5/18* (2013.01); *B32B 5/32* (2013.01);
(Continued)

(58) Field of Classification Search
CPC ...... D21H 27/38; D21H 27/007; D21H 21/56; D21H 27/30; B32B 5/18; B32B 5/32;
(Continued)

(56) References Cited

U.S. PATENT DOCUMENTS

| | | | |
|---|---|---|---|
| 3,994,771 | A | 11/1976 | Morgan et al. |
| 5,164,045 | A | 11/1992 | Awofeso et al. |

(Continued)

FOREIGN PATENT DOCUMENTS

| | | |
|---|---|---|
| CN | 107531009 A | 1/2018 |
| CO | 4180389 A1 | 6/1995 |

(Continued)

OTHER PUBLICATIONS

Tanaka, et al., "Foam Formed Non-Wovens From Yarns and Fibres", Cellulose from Finland, https://cellulosefromfinland.fi/foam-formed-multi-layer-textile-structures/.

(Continued)

*Primary Examiner* — Abbas Rashid
*Assistant Examiner* — Matthew M Eslami
(74) *Attorney, Agent, or Firm* — Dority & Manning, P.A.

(57) ABSTRACT

A one-ply absorbent article comprising a nonwoven first layer; a non-woven third layer; a nonwoven second layer between the first layer and the third layer; and wherein the one-ply absorbent article has a first absorbency measure at a first delamination state and a second absorbency measure at a second delamination state, wherein the first absorbency
(Continued)

measure is less than the second absorbency measure and the first delamination state is less than the second delamination state.

15 Claims, 3 Drawing Sheets

(51) Int. Cl.
*B32B 5/18* (2006.01)
*B32B 5/32* (2006.01)
*B32B 7/06* (2019.01)
*D21F 11/00* (2006.01)
*D21H 27/00* (2006.01)

(52) U.S. Cl.
CPC .............. *B32B 7/06* (2013.01); *D21F 11/002* (2013.01); *D21H 27/007* (2013.01); *B32B 2250/22* (2013.01); *B32B 2260/02* (2013.01); *B32B 2260/04* (2013.01); *B32B 2262/0253* (2013.01); *B32B 2262/062* (2013.01); *B32B 2262/067* (2013.01); *B32B 2307/726* (2013.01); *B32B 2555/02* (2013.01)

(58) Field of Classification Search
CPC ... B32B 7/06; B32B 2250/22; B32B 2260/02; B32B 2260/04; B32B 2262/0253; B32B 2262/062; B32B 2262/067; B32B 2555/02; B32B 2307/726; B32B 2262/065; B32B 5/022; B32B 5/08; B32B 2262/0276; B32B 2262/04; B32B 2262/12; B32B 2555/00; B32B 5/245; B32B 5/26; D21F 11/002
See application file for complete search history.

(56) References Cited

U.S. PATENT DOCUMENTS

| | | | |
|---|---|---|---|
| 5,260,345 | A | 11/1993 | DesMarais et al. |
| 5,397,316 | A | 3/1995 | LaVon et al. |
| 5,550,167 | A | 8/1996 | DesMarais |
| 5,851,648 | A | 12/1998 | Stone et al. |
| 5,869,171 | A | 2/1999 | Shiveley et al. |
| 5,899,893 | A | 5/1999 | Dyer et al. |
| 6,743,212 | B1 | 6/2004 | Cole et al. |
| 7,244,489 | B2 | 7/2007 | Owensby |
| 8,158,689 | B2 | 4/2012 | Baker et al. |
| 8,410,331 | B2 | 4/2013 | Janusson et al. |
| 2003/0127202 | A1 | 7/2003 | Reinheimer et al. |
| 2009/0183846 | A1 | 7/2009 | Hermans et al. |
| 2019/0161915 | A1 | 5/2019 | Swails et al. |
| 2020/0370246 | A1* | 11/2020 | Calewarts .............. D04H 1/593 |

FOREIGN PATENT DOCUMENTS

| | | | |
|---|---|---|---|
| EP | 0675225 B1 | 2/2000 | |
| EP | 2492393 A1 | 8/2012 | |
| WO | 2008072661 A1 | 6/2008 | |
| WO | WO-2010021572 A1 * | 2/2010 | ............. B32B 29/02 |
| WO | 2015176063 A1 | 11/2015 | |
| WO | 2018004709 A1 | 1/2018 | |
| WO | 2019108172 A1 | 6/2019 | |

OTHER PUBLICATIONS

Brodin, et al., "Reinforced absorbent material: A cellulosic composite of TEMPO-oxidized MFC and CTMP fibres", Cellulose, https://link.springer.com/article/10.1007%2Fs10570-012-9706-4.

* cited by examiner

ABSORBENT ARTICLES AND METHODS FOR MANUFACTURING SAME

This application claims priority from U.S. provisional Patent Application Ser. No. 62/923,826 filed on 21 Oct. 2019, the entire contents of which are incorporated herein by reference.

BACKGROUND

In many tissue products, such as facial tissue, bath tissue, paper towels, industrial wipers, and the like, absorbency is an important characteristic. Traditionally, increasing absorbency has been achieved through, for example, making multi-ply sheets. However, manufacturing multi-ply sheets adds complexities and costs to the products.

SUMMARY

In general, the present disclosure relates to a one-ply, multi-layer absorbent article. In general, one aspect of the subject matter described in this specification can be implemented in an article that includes a nonwoven first layer; a nonwoven third layer; a nonwoven second layer between the first layer and the third layer; and wherein the one-ply absorbent article has a first absorbency measure at a first delamination state and a second absorbency measure at a second delamination state, wherein the first absorbency measure is less than the second absorbency measure and the first delamination state is less than the second delamination state. In some implementations, the article can only include three layers. Other embodiments of this aspect include corresponding methods.

Yet another aspect of the subject matter described in this specification can be implemented in an article that includes a one-ply absorbent article comprising a nonwoven first layer; a nonwoven second layer adjacent the first layer; and wherein the one-ply absorbent article has first absorbency measure at a first delamination state, and a second absorbency measure, greater than the first absorbency measure, at a second delamination state greater than the first delamination state. In some implementations, the article can only include two layers. Other embodiments of this aspect include corresponding methods.

Particular embodiments of the subject matter described in this specification can be implemented so as to realize one or more of the following advantages. For example, one-ply, multi-layer products can be made having the absorbency of two-ply products without the complexities or costs of two-ply manufacturing by engineering a controlled measured of delamination between given layers of the one-ply products. This also allows the packing and shipping benefits of one-ply (e.g., less bulky shipping forms) versus two-ply products, which tend to require more shipping volume (and hence more cost) on a product-per-product basis than one-ply counterparts.

The details of one or more implementations of the subject matter described in this specification are set forth in the accompanying drawings and the description below. Other features, aspects, and advantages of the subject matter will become apparent from the description, the drawings, and the claims.

Figure 1:
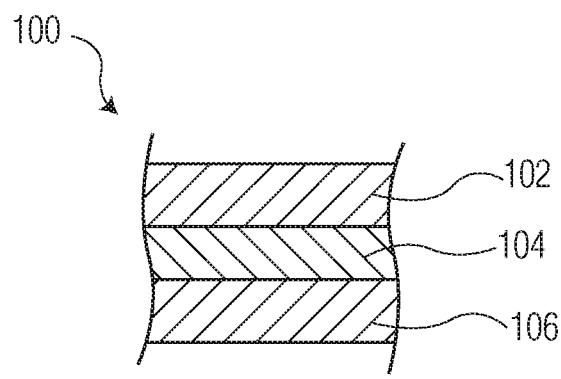
FIG. 1 is an example representation of a cross section of a one-ply, three-layer absorbent article in a first delamination state.

Repeat use of reference characters in the present specification and drawings is intended to represent the same or analogous features or elements of the present invention.

DETAILED DESCRIPTION

The present disclosure generally relates to single-ply (one-ply), multi-layer absorbent articles that are engineered to delaminate in a controlled manner to increase absorbency. In some implementations, the single-ply, multi-layer absorbent article is a three-layer structure having a top layer separated from a bottom layer by a middle layer, where the absorbent article is a foam formed product, as described in more detail below. The absorbent article is formed in such a way that the top layer is loosely bound to the middle layer and the bottom layer is loosely bound to the middle layer to promote controlled delamination of the top and bottom layers from the middle layer (e.g., the top and bottom layers are loosely hydrogen bonded to the middle layer). For example, one or more layers of the absorbent article are designed to delaminate in response to agitation or manipulation during a hand drying process as the user works the absorbent article to absorb water from the user's hands.

In this way voids (e.g., open spaces between the fibers or fiber bundles) are created between, for example, the top and bottom layers and the middle layer that increase the absorbency of the absorbent article, as compared to the absorbency of the absorbent article prior to the voids being created. This engineered delamination and improved single-ply, multi-layer absorbent article are discussed in more detail below with reference to FIG. 1.

FIG. 1 is an example representation of a cross section of a one-ply, three-layer absorbent article 100 in a first delamination state. More specifically, this three-layer article has a first nonwoven layer 102, a second nonwoven layer 104 and a third nonwoven layer 106. A nonwoven layer is layer having a structure of individual fibers or threads which are interlaid, but not in an identifiable manner as in a knitted layer. Nonwoven layers can be formed from many processes, such as, for example, meltblowing processes, spunbonding processes, air-laying processes, coforming processes, bonded carded web processes and foam forming processes, as described in more detail below.

The absorbent article 100 can be, for example, a wipe, wiper, towel, tissue or a component of a larger absorbent structure such as a diaper or other personal care product. The performance of the absorbent article 100 can be quantified in various metrics including, for example, absorbency. The absorbency measurement (A) reflects how much how of a liquid the absorbent article can hold on a relative basis, and is defined, for example, per Equation 1 below:

$$A = \frac{Wet - Dry}{Dry}$$

where "Wet" is the weight, in grams, of the absorbent article after it has been saturated in a water and "Dry" is the weight, in grams, of the absorbent article in a dry state (i.e., without absorbing water other than through ambient environmental/humidity conditions).

As described above, the absorbent article 100 is designed to delaminate, e.g., in response to certain conditions such as by mechanical manipulations during dispensing or as a user working the article to dry his/her hands, to increase its absorbency. The lamination strength between layers must be such that it remains intact during in-process winding (e.g., during manufacturing and packaging of the article) and unwinding operations in converting (e.g., during the process in which the article is converted into the format for sale to an end user). As such the absorbent article 100 has a first delamination state corresponding to a first absorbency measure and a second delamination state corresponding to a second absorbency measure where the first absorbency measure is less than the second absorbency measure (i.e., the "A" from Equation 1 for the first absorbency measure is less than the "A" from Equation 1 for the second absorbency measure) and the first delamination state is less than the second delamination state.

Figure 2:
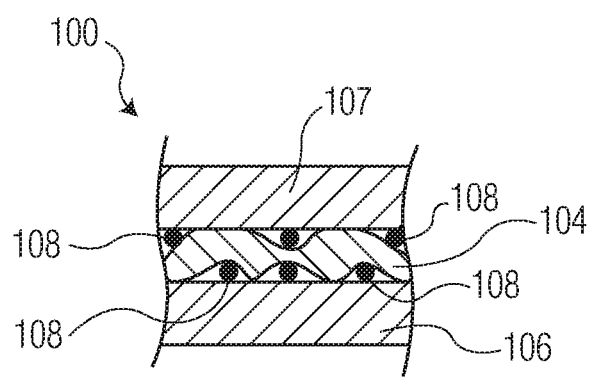
FIG. 2 is an example representation of a cross section of the absorbent article of FIG. 1 in a second delamination state.

The first delamination state being less than the second delamination state means that the level or amount of delamination or separation of the first layer 102 from the second layer 104 and/or that of the third layer 106 from the second layer 104 in the first delamination state is less than (or not as significant as) the level or amount of delamination or separation of the first layer 102 from the second layer 104 and/or that of the third layer 106 from the second layer 104 in the second delamination state. This is illustrated in the differences between FIGS. 1 and 2, where FIG. 2 is an example representation of a cross section of the absorbent article 100 in a second delamination state and shows the voids 108 created from the delamination. The voids 108 in FIG. 2 are representative of areas of delamination where the respective surfaces of the first and third layers 102 and 106 have separated from the second layer 104 leaving open cavities (i.e., voids 108). It is believed these voids 108 allow for the increased absorbency of the article 100 in the second delamination state, as compared to the first delamination state.

More generally, the first delamination state can include a state or condition with no or little (intentional) delamination, and the second delamination state is defined relative to the first delamination state such that the second delamination state is simply a state with a greater extent of delamination (or layer separation) than the first delamination state.

A series of experiments were performed to demonstrate the effect of controlled delamination of the single-ply, multi-layer absorbent article, as described below.

First Delamination State Testing—each sample was gathered from the production process without any intentional attempt to cause delamination or disturb the sample beyond normal handling procedures and conventions.

For each sample, a one-inch square piece of material was cut and weighed to get the Dry weight for Equation 1 above. Next, this sample was completely submerged in water for fifteen seconds and then removed and hung from one corner and allowed to drip dry for fifteen seconds. Then a piece of blotter paper was touched to the lowest corner of the sample to remove any water droplet hanging on that corner. Finally, the wet sample was weighed to determine its Wet weight for Equation 1.

Second Delamination State

For each sample, a one-inch square piece of material was cut and weighed to get the Dry weight for Equation 1. The sample was then was folded in half three times (each time along its longest dimension) and then unfolded—this folding and unfolding manipulation (e.g., applying a delamination force) caused the second delamination state. Next, this sample was completely submerged in water for fifteen seconds and then removed and hung from one corner and allowed to drip dry for fifteen seconds. Then a piece of blotter paper was touched to the lowest corner of the sample to remove any water droplet hanging on that corner. Finally, the wet sample was weighed to determine its Wet weight for Equation 1.

Samples

Six samples were tested per the above test method. Sample A was the inventive one-ply, three-layer absorbent article 100 described herein, Sample, B, was a KLEENEX one-ply Hand Towel (50606), Sample C was a KLEENEX two-ply Hand Towel (46321), Sample D was a TORK Advanced one-ply Hand Towel (290095), Sample E was a Georgia-Pacific Pro enMotion one-ply Hand Towel (89460), and Sample F was a TORK Premium two-ply Hand Towel (290019). For each sample, ten examples of that sample were tested, as reflected in the results below.

Results

Sample A

TABLE 1

| | Dry (grams) | | Wet (grams) | | A | |
|---|---|---|---|---|---|---|
| Example # | First Delamination State | Second Delamination State | First Delamination State | Second Delamination State | First Delamination State | Second Delamination State |
| 1 | 0.07 | 0.05 | 0.64 | 0.67 | 8.14 | 12.40 |
| 2 | 0.08 | 0.06 | 0.71 | 0.65 | 7.88 | 9.83 |
| 3 | 0.08 | 0.05 | 0.66 | 0.59 | 7.25 | 10.80 |
| 4 | 0.09 | 0.07 | 0.7 | 0.76 | 6.78 | 9.86 |
| 5 | 0.06 | 0.09 | 0.62 | 1.05 | 9.33 | 10.67 |
| 6 | 0.08 | 0.09 | 0.74 | 1.11 | 8.25 | 11.33 |
| 7 | 0.08 | 0.08 | 0.62 | 0.97 | 6.75 | 11.13 |
| 8 | 0.06 | 0.08 | 0.54 | 0.9 | 8.00 | 10.25 |
| 9 | 0.07 | 0.1 | 0.63 | 1.09 | 8.00 | 9.90 |
| 10 | 0.06 | 0.08 | 0.65 | 0.97 | 9.83 | 11.13 |
| Avg 1st | 8.02 | | Avg 2nd | 10.73 | Increase | 34% |

As shown in Table 1, for the first example of Sample A, the first absorbency measure for the first delamination state is 8.14 and the second absorbency measure for the second absorbency state is 12.40, and for the second example of Sample A, the first absorbency measure for the first delamination state is 7.88 and the second absorbency measure for the second absorbency state is 9.83. Continuing, for the tenth example of Sample A, the first absorbency measure for the first delamination state is 9.83 and the second absorbency measure for the second absorbency state is 11.13.

The average of the first absorbency measure (A) for all ten examples of Sample A is 8.02. The average of the second absorbency measure (A) for all ten examples of Sample A is 10.73. The increase between the first absorbency measure and the second absorbency measure for all ten examples of Sample A is thirty-four percent. Thus, the effect of the moving from the first delamination state to the second delamination state for the article 100 resulted in a thirty-four percent increase in absorbency (A). As described above, it is believed that the additional void volume created (e.g., voids 108) by the greater extent of delamination in the second delamination state provides the article 100, for example, with a means to capture liquid between first layer 102 and third layer 106, resulting in greater absorbency capacity as shown in Table 1.

Sample B

TABLE 2

| # | Dry | | Wet | | A | |
| --- | --- | --- | --- | --- | --- | --- |
| | First Delamination State | Second Delamination State | First Delamination State | Second Delamination State | First Delamination State | Second Delamination State |
| 1 | 0.05 | 0.07 | 0.32 | 0.42 | 5.40 | 5.00 |
| 2 | 0.06 | 0.06 | 0.42 | 0.36 | 6.00 | 5.00 |
| 3 | 0.06 | 0.06 | 0.42 | 0.4 | 6.00 | 5.67 |
| 4 | 0.05 | 0.07 | 0.34 | 0.43 | 5.80 | 5.14 |
| 5 | 0.05 | 0.06 | 0.38 | 0.37 | 6.60 | 5.17 |
| 6 | 0.05 | 0.06 | 0.34 | 0.42 | 5.80 | 6.00 |
| 7 | 0.06 | 0.07 | 0.41 | 0.48 | 5.83 | 5.86 |
| 8 | 0.06 | 0.06 | 0.4 | 0.41 | 5.67 | 5.83 |
| 9 | 0.05 | 0.07 | 0.33 | 0.42 | 5.60 | 5.00 |
| 10 | 0.05 | 0.06 | 0.37 | 0.42 | 6.40 | 6.00 |
| Avg 1st | 5.91 | | Avg 2nd | 5.47 | Increase | −8% |

As shown in Table 2, for the first example of Sample B, the first absorbency measure for the first delamination state is 5.40 and the second absorbency measure for the second absorbency state is 5.00, and for the second example of Sample B, the first absorbency measure for the first delamination state is 6.00 and the second absorbency measure for the second absorbency state is 5.00. Continuing, for the tenth example of Sample B, the first absorbency measure for the first delamination state is 6.40 and the second absorbency measure for the second absorbency state is 6.00. The average of the first absorbency measure (A) for all ten examples of Sample B is 5.91. The average of the second absorbency measure (A) for all ten examples of Sample B is 5.47. The value between the first absorbency measure and the second absorbency measure for all ten examples of Sample B decreased eight percent. It is believed that the process of "working" Sample B to move to the second delamination state collapsed void volume thereby reducing is effective absorbency.

Sample C

TABLE 3

| # | Dry | | Wet | | A | |
| --- | --- | --- | --- | --- | --- | --- |
| | First Delamination State | Second Delamination State | First Delamination State | Second Delamination State | First Delamination State | Second Delamination State |
| 1 | 0.07 | 0.07 | 0.71 | 0.69 | 9.14 | 8.86 |
| 2 | 0.06 | 0.05 | 0.73 | 0.6 | 11.17 | 11.00 |
| 3 | 0.07 | 0.07 | 0.74 | 0.63 | 9.57 | 8.00 |
| 4 | 0.07 | 0.08 | 0.77 | 0.76 | 10.00 | 8.50 |
| 5 | 0.06 | 0.07 | 0.7 | 0.74 | 10.67 | 9.57 |
| 6 | 0.06 | 0.06 | 0.71 | 0.61 | 10.83 | 9.17 |
| 7 | 0.06 | 0.07 | 0.68 | 0.78 | 10.33 | 10.14 |

TABLE 3-continued

| | Dry | | Wet | | A | |
|---|---|---|---|---|---|---|
| # | First Delamination State | Second Delamination State | First Delamination State | Second Delamination State | First Delamination State | Second Delamination State |
| 8 | 0.07 | 0.07 | 0.72 | 0.77 | 9.29 | 10.00 |
| 9 | 0.06 | 0.06 | 0.69 | 0.68 | 10.50 | 10.33 |
| 10 | 0.06 | 0.08 | 0.69 | 0.82 | 10.50 | 9.25 |
| Avg 1st | 10.20 | | Avg 2nd | 9.48 | Increase | −7% |

As shown in Table 3, for the first example of Sample C, the first absorbency measure for the first delamination state is 9.14 and the second absorbency measure for the second absorbency state is 8.86, and for the second example of Sample C, the first absorbency measure for the first delamination state is 11.17 and the second absorbency measure for the second absorbency state is 11.0. Continuing, for the tenth example of Sample C, the first absorbency measure for the first delamination state is 10.50 and the second absorbency measure for the second absorbency state is 9.25. The average of the first absorbency measure (A) for all ten examples of Sample C is 10.20. The average of the second absorbency measure (A) for all ten examples of Sample C is 9.48. The value between the first absorbency measure and the second absorbency measure for all ten examples of Sample C decreased seven percent. It is believed that the process of "working" Sample C to move to the second delamination state collapsed void volume thereby reducing is effective absorbency.

Sample D

TABLE 4

| | Dry | | Wet | | A | |
|---|---|---|---|---|---|---|
| # | First Delamination State | Second Delamination State | First Delamination State | Second Delamination State | First Delamination State | Second Delamination State |
| 1 | 0.05 | 0.04 | 0.32 | 0.3 | 5.40 | 6.50 |
| 2 | 0.06 | 0.05 | 0.35 | 0.29 | 4.83 | 4.80 |
| 3 | 0.06 | 0.06 | 0.36 | 0.32 | 5.00 | 4.33 |
| 4 | 0.05 | 0.05 | 0.33 | 0.3 | 5.60 | 5.00 |
| 5 | 0.05 | 0.05 | 0.38 | 0.31 | 6.60 | 5.20 |
| 6 | 0.05 | 0.04 | 0.41 | 0.29 | 7.20 | 6.25 |
| 7 | 0.04 | 0.04 | 0.29 | 0.29 | 6.25 | 6.25 |
| 8 | 0.05 | 0.05 | 0.32 | 0.34 | 5.40 | 5.80 |
| 9 | 0.04 | 0.05 | 0.3 | 0.31 | 6.50 | 5.20 |
| 10 | 0.06 | 0.04 | 0.33 | 0.28 | 4.50 | 6.00 |
| Avg 1st | 5.73 | | Avg 2nd | 5.53 | Increase | −3% |

As shown in Table 4, for the first example of Sample D, the first absorbency measure for the first delamination state is 5.40 and the second absorbency measure for the second absorbency state is 6.50, and for the second example of Sample D, the first absorbency measure for the first delamination state is 4.83 and the second absorbency measure for the second absorbency state is 4.86. Continuing, for the tenth example of Sample D, the first absorbency measure for the first delamination state is 4.5 and the second absorbency measure for the second absorbency state is 6.00. The average of the first absorbency measure (A) for all ten examples of Sample D is 5.73. The average of the second absorbency measure (A) for all ten examples of Sample D is 5.53. The value between the first absorbency measure and the second absorbency measure for all ten examples of Sample D decreased three percent. It is believed that the process of "working" Sample D to move to the second delamination state collapsed void volume thereby reducing is effect absorbency.

Sample E

TABLE 5

| | Dry | | Wet | | A | |
|---|---|---|---|---|---|---|
| # | First Delamination State | Second Delamination State | First Delamination State | Second Delamination State | First Delamination State | Second Delamination State |
| 1 | 0.09 | 0.08 | 0.49 | 0.44 | 4.44 | 4.50 |
| 2 | 0.1 | 0.08 | 0.51 | 0.42 | 4.10 | 4.25 |
| 3 | 0.07 | 0.06 | 0.41 | 0.32 | 4.86 | 4.33 |
| 4 | 0.09 | 0.06 | 0.46 | 0.35 | 4.11 | 4.83 |
| 5 | 0.08 | 0.06 | 0.42 | 0.32 | 4.25 | 4.33 |
| 6 | 0.07 | 0.07 | 0.4 | 0.37 | 4.71 | 4.29 |
| 7 | 0.08 | 0.07 | 0.42 | 0.35 | 4.25 | 4.00 |
| 8 | 0.09 | 0.06 | 0.46 | 0.31 | 4.11 | 4.17 |
| 9 | 0.08 | 0.08 | 0.43 | 0.43 | 4.38 | 4.38 |
| 10 | 0.09 | 0.07 | 0.46 | 0.36 | 4.11 | 4.14 |
| Avg 1st | 4.33 | | Avg 2nd | 4.32 | Increase | 0% |

As shown in Table 5, for the first example of Sample E, the first absorbency measure for the first delamination state is 4.44 and the second absorbency measure for the second absorbency state is 4.50, and for the second example of Sample E, the first absorbency measure for the first delamination state is 4.10 and the second absorbency measure for the second absorbency state is 4.25. Continuing, for the tenth example of Sample E, the first absorbency measure for the first delamination state is 4.11 and the second absorbency measure for the second absorbency state is 4.14. The average of the first absorbency measure (A) for all ten examples of Sample E is 4.33. The average of the second absorbency measure (A) for all ten examples of Sample E is 4.32. The value between the first absorbency measure and the second absorbency measure for all ten examples of Sample E remained the same.

Sample F

TABLE 6

| | Dry | | Wet | | A | |
|---|---|---|---|---|---|---|
| # | First Delamination State | Second Delamination State | First Delamination State | Second Delamination State | First Delamination State | Second Delamination State |
| 1 | 0.07 | 0.06 | 0.49 | 0.43 | 6.00 | 6.17 |
| 2 | 0.08 | 0.07 | 0.52 | 0.45 | 5.50 | 5.43 |
| 3 | 0.07 | 0.07 | 0.48 | 0.5 | 5.86 | 6.14 |
| 4 | 0.07 | 0.07 | 0.5 | 0.53 | 6.14 | 6.57 |
| 5 | 0.07 | 0.06 | 0.5 | 0.4 | 6.14 | 5.67 |
| 6 | 0.08 | 0.08 | 0.51 | 0.53 | 5.38 | 5.63 |
| 7 | 0.07 | 0.07 | 0.49 | 0.51 | 6.00 | 6.29 |
| 8 | 0.06 | 0.07 | 0.44 | 0.5 | 6.33 | 6.14 |
| 9 | 0.07 | 0.06 | 0.51 | 0.42 | 6.29 | 6.00 |
| 10 | 0.08 | 0.06 | 0.53 | 0.43 | 5.63 | 6.17 |
| Avg 1st | 5.93 | | Avg 2nd | 6.02 | Increase | 2% |

As shown in Table 6, for the first example of Sample F, the first absorbency measure for the first delamination state is 6.00 and the second absorbency measure for the second absorbency state is 6.17, and for the second example of Sample F, the first absorbency measure for the first delamination state is 5.50 and the second absorbency measure for the second absorbency state is 5.43. Continuing, for the tenth example of Sample F, the first absorbency measure for the first delamination state is 5.63 and the second absorbency measure for the second absorbency state is 6.17. The average of the first absorbency measure (A) for all ten examples of Sample F is 5.93. The average of the second absorbency measure (A) for all ten examples of Sample F is 6.02. The value between the first absorbency measure and the second absorbency measure for all ten examples of Sample F increased slightly by two percent, which could be attributable to testing tolerances.

Thus the test results clearly show that the designed, partial delamination of the absorbent article 100 in the second delamination state dramatically increases its absorbency up to the levels of some two-ply products and beyond. For example, the second absorbency measure is about five to thirty-four percent greater than the first absorbency measure, or the second absorbency measure is about ten to thirty-four percent greater than the first absorbency measure, or the second absorbency measure is about twenty to thirty percent greater than the first absorbency measure, or the second absorbency measure is at least ten percent greater than the first absorbency measure, as shown in the above Tables.

However, complete or full delamination should be avoided as, in that case, the multi-layered absorbent article would separate into individual layers and compromise a user's cleaning or drying experience. Interply bonding and attachment may be controlled in numerous ways. For example, pulp fibers of various degrees of crosslinking or having various debonder chemistry treatment may be used to interfere with fiber-to-fiber bonding in a way to manage lamination strength. Non or low bonding synthetic fibers and/or particles may also be utilized in the second layer 104 to manage lamination strength between first and third layers 102, 106.

In some implementations, the amount of delamination can be selected such that the absorbent article 100 reaches the second delamination state through typical manipulation by a user drying his/her hands and/or dispensing the article through a dispenser. For example, if the article 100 is a paper hand towel then the feeding of the paper hand towel through the dispensing mechanism of the paper towel dispenser is sufficient to cause the article 100 to reach the second delamination state and (thus) have the second absorbency measure to better dry the user's hands.

In some implementations, the article 100 has first and third layers 102, 106 made from northern softwood pulp and a second layer 104 made from a debonded cellulosic fiber. As described below the nonwoven layers 102, 104 and 106 can be made from other fibers.

In some implementations, the article 100 can be a foam formed product. A foam formed product is a product formed from a suspension including a mixture of a solid, a liquid, and dispersed gas bubbles. Solids in the suspension for a foam formed product can include solid particulates, such as, for example, natural and/or man-made fibers. Other solids that can be added in the suspension, for example, include superabsorbent material like activated carbon, micro-encapsulated active ingredients, calcium carbonate, titanium dioxide. Liquids in the suspension for the foam formed product can, for example, include water. In some implementations, surfactants can, for example, be utilized in the suspension. The suspension for the foam formed product can, for example, include air as a gas component that forms dispersed gas bubbles. In some implementations, the air content within the suspension can range from about 20% to about 95% or from about 30% to about 80%. In some implementations, the gas bubbles can include an alternative or an additional gas.

Figure 3:
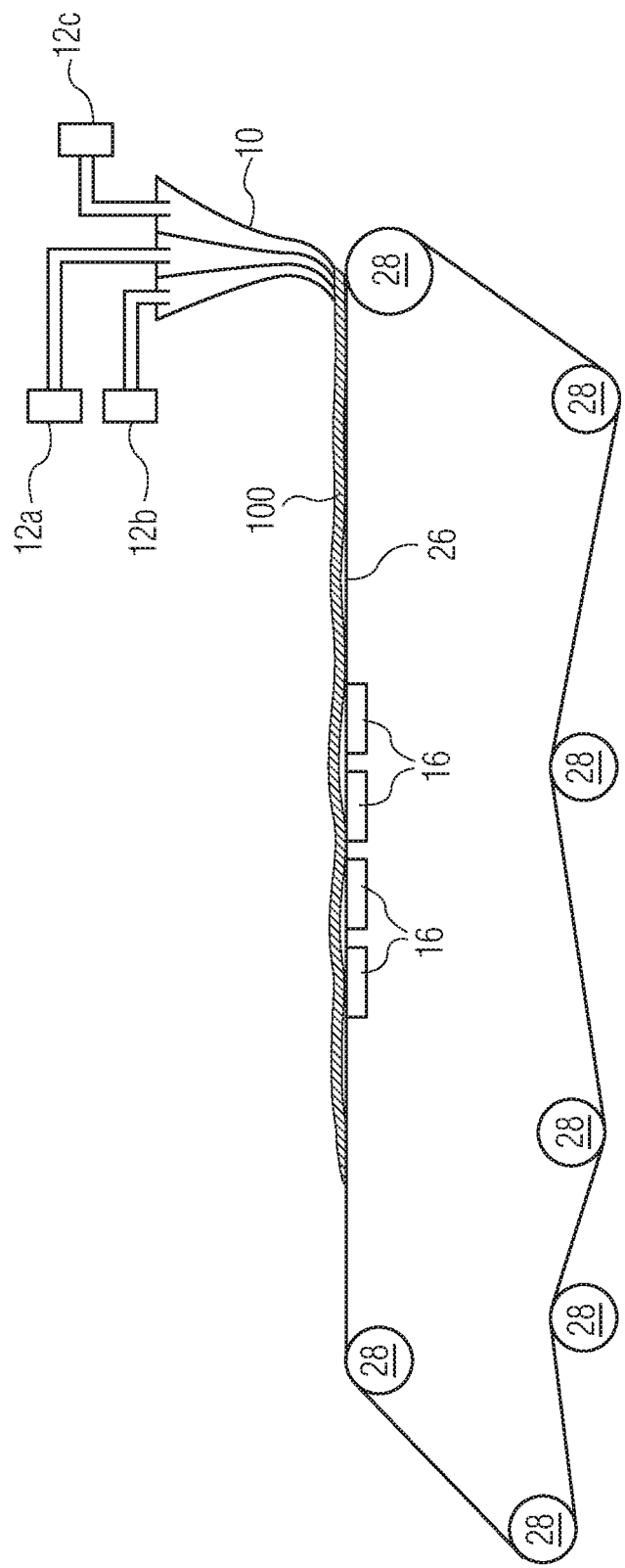
FIG. 3 is a schematic diagram of an example process of making one-ply, multi-layer absorbent article.

FIG. 3 is a schematic diagram of an example process of making one-ply, multi-layer absorbent article, for example, as a foam formed product described above. In some implementations, for example, in one implementation of the process structure depicted in FIG. 3, a foam is first formed by combining water with a foaming agent. The foaming agent, for instance, may comprise any suitable surfactant. In one embodiment, for instance, the foaming agent may comprise sodium lauryl sulfate, which is also known as sodium laureth sulfate or sodium lauryl ether sulfate. Other foaming agents include sodium dodecyl sulfate or ammonium lauryl sulfate. In other embodiments, the foaming agent may comprise any suitable cationic and/or amphoteric surfactant. For instance, other foaming agents include fatty acid amines, amides, amine oxides, fatty acid quaternary compounds, and the like.

In some implementations, the foaming agent is combined with water generally in an amount greater than about 2% by weight, such as in an amount greater than about 5% by weight, such as in an amount greater than about 10% by weight, such as in an amount greater than about 15% by weight. One or more foaming agents are generally present in an amount less than about 50% by weight, such as in an amount less than about 40% by weight, such as in an amount less than about 30% by weight, such as in an amount less than about 20% by weight.

Once the foaming agent and water are combined, the mixture is blended or otherwise subjected to forces capable of forming a foam. A foam generally refers to a porous matrix, which is an aggregate of hollow cells or bubbles which may be interconnected to form channels or capillaries.

The foam density can vary depending upon the particular application and various factors including the fiber furnish used. In some implementations, for example, the foam density of the foam can be greater than about 200 g/L, such as greater than about 250 g/L, such as greater than about 300 g/L. The foam density is generally less than about 600 g/L, such as less than about 500 g/L, such as less than about 400 g/L, such as less than about 350 g/L. In some implementations, for example, a lower density foam is used having a foam density of generally less than about 350 g/L, such as less than about 340 g/L, such as less than about 330 g/L. The foam will generally have an air content of greater than about 30%, such as greater than about 50%, such as greater than about 60%. The air content is generally less than about 80% by volume, such as less than about 70% by volume, such as less than about 65% by volume.

Once the foam is formed, the foam is combined with a fiber furnish. In general, any fibers capable of making a tissue or paper web or other similar type of nonwoven in accordance with the present disclosure may be used.

Fibers suitable for making nonwoven layers may include various natural or synthetic cellulosic fibers including, but not limited to nonwoody fibers, such as cotton, abaca, kenaf, sabai grass, flax, esparto grass, straw, jute hemp, bagasse, milkweed floss fibers, and pineapple leaf fibers; and woody or pulp fibers such as those obtained from deciduous and coniferous trees, including softwood fibers, such as northern and southern softwood kraft fibers; hardwood fibers, such as eucalyptus, maple, birch, and aspen. Pulp fibers can be prepared in high-yield or low-yield forms and can be pulped in any known method, including kraft, sulfite, high-yield pulping methods and other known pulping methods. Fibers prepared from organosolv pulping methods can also be used.

A portion of the fibers, such as up to 50% or less by dry weight, or from about 5% to about 30% by dry weight, can be synthetic fibers such as rayon, polyolefin fibers, polyester fibers, bicomponent sheath-core fibers, multi-component binder fibers, and the like. An exemplary polyethylene fiber is Fybrel®, available from Minifibers, Inc. (Jackson City, Tenn.). Any known bleaching method can be used. Synthetic cellulose fiber types include rayon in all its varieties and other fibers derived from viscose or chemically-modified cellulose. Chemically treated natural cellulosic fibers can be used such as mercerized pulps, chemically stiffened, debonded or crosslinked fibers, or sulfonated fibers. For good mechanical properties in using papermaking fibers, it can be desirable that the fibers be relatively undamaged and largely unrefined or only lightly refined. While recycled fibers can be used, virgin fibers are generally useful for their mechanical properties and lack of contaminants. Mercerized fibers, regenerated cellulosic fibers, cellulose produced by microbes, rayon, and other cellulosic material or cellulosic derivatives can be used. Suitable papermaking fibers can also include recycled fibers, virgin fibers, or mixes thereof. In certain embodiments capable of high bulk and good compressive properties, the fibers can have a Canadian Standard Freeness of at least 200, more specifically at least 300, more specifically still at least 400, and most specifically at least 500.

Other papermaking fibers that can be used in the present disclosure include paper broke or recycled fibers and high yield fibers. High yield pulp fibers are those papermaking fibers produced by pulping processes providing a yield of about 65% or greater, more specifically about 75% or greater, and still more specifically about 75% to about 95%. Yield is the resulting amount of processed fibers expressed as a percentage of the initial wood mass. Such pulping processes include bleached chemithermomechanical pulp (BCTMP), chemithermomechanical pulp (CTMP), pressure/pressure thermomechanical pulp (PTMP), thermomechanical pulp (TMP), thermomechanical chemical pulp (TMCP), high yield sulfite pulps, and high yield Kraft pulps, all of which leave the resulting fibers with high levels of lignin. High yield fibers are well known for their stiffness in both dry and wet states relative to typical chemically pulped fibers.

The tissue web can also be formed without a substantial amount of inner fiber-to-fiber bond strength. In this regard, the fiber furnish used to form the base web can be treated with a chemical debonding agent. The debonding agent can be added to the foamed fiber slurry during the pulping process or can be added directly to the headbox. Suitable debonding agents that may be used in the present disclosure include cationic debonding agents such as fatty dialkyl quaternary amine salts, mono fatty alkyl tertiary amine salts, primary amine salts, imidazoline quaternary salts, silicone quaternary salt and unsaturated fatty alkyl amine salts. Other suitable debonding agents are disclosed in U.S. Pat. No. 5,529,665 to Kaun which is incorporated herein by reference. In particular, Kaun discloses the use of cationic silicone compositions as debonding agents. Any of these materials may be used to establish the correct level of lamination strength between the various layers in article 100.

In one embodiment, the debonding agent used in the process of the present disclosure is an organic quaternary ammonium chloride and, particularly, a silicone-based amine salt of a quaternary ammonium chloride. For example, the debonding agent can be PROSOFT® TQ1003, marketed by the Solenis Corporation. The debonding agent can be added to the fiber slurry in an amount of from about 1 kg per metric tonne to about 10 kg per metric tonne of fibers present within the slurry.

In an alternative embodiment, the debonding agent can be an imidazoline-based agent. The imidazoline-based debonding agent can be obtained, for instance, from the Witco Corporation. The imidazoline-based debonding agent can be added in an amount of between 2.0 to about 15 kg per metric tonne.

Other optional chemical additives may also be added to the aqueous papermaking furnish or to the formed embryonic web to impart additional benefits to the product and process. The following materials are included as examples of additional chemicals that may be applied to the web. The chemicals are included as examples and are not intended to limit the scope of the invention. Such chemicals may be added at any point in the papermaking process.

Additional types of chemicals that may be added to the paper web include, but is not limited to, absorbency aids usually in the form of cationic, anionic, or non-ionic surfactants, humectants and plasticizers such as low molecular weight polyethylene glycols and polyhydroxy compounds such as glycerin and propylene glycol. Materials that supply skin health benefits such as mineral oil, aloe extract, vitamin E, silicone, lotions in general and the like may also be incorporated into the finished products.

As shown particularly in FIG. 3, the foamed fiber suspension for the first layer 102 can be fed to a tank 12a, the foamed fiber suspension for the second layer 104 can be fed to a tank 12b, and the foamed fiber suspension for the third layer 106 can be fed to a tank 12c, and then all three suspensions are fed to the three-chambered headbox 10, which allows the three foamed suspensions to be combined in a way that causes very little layer-to-layer mixing of the fibers in the suspensions. From the headbox 10, the foamed fiber suspensions are issued onto an endless traveling forming fabric 26 supported and driven by rolls 28 in order to form the one-ply, three-layered article 100.

Because the three layers 102, 104, and 106 are foam formed they are highly uniform and there is limited layer-to-layer-fiber mixing or intertwining of the fibers which helps to promote the controlled delamination (as high layer-to-layer fiber intermixing decreases the ability to delaminate). As described elsewhere, complete layer-to-layer delamination is undesired so fiber selection, layer forming techniques, fiber treatment and post forming processes (e.g., post headbox bonding) are tools used to selectively dial in the precise amount of delamination desired to achieve the absorbency increases described herein between the first and second delamination states.

Once article 100 is formed on the forming fabric 26, the article 100 can be, for example, conveyed downstream and dewatered. For instance, the process can include a plurality of vacuum devices 16, such as vacuum boxes and vacuum rolls. The vacuum boxes 16 assist in removing moisture from the newly formed article 100. From the forming fabric 26, the newly formed article 100 may, for example, be conveyed downstream and dried on a through-air dryer.

The basis weight of absorbent articles 100 made in accordance with the present disclosure can vary depending upon the final product. For example, the process may be used to produce paper towels, industrial wipers, and the like. In general, the basis weight of these products may vary from about 20 gsm to about 100 gsm. For paper towels, on the other hand, the basis weight may range from about 20 gsm to about 65 gsm.

As described above the absorbent article 100 provides benefits, for example, of a two-ply without some of the manufacturing complexities associated with making two-ply products. For comparison purposes, with the one-ply process of FIG. 3, a two-ply process involves (1) making a first one-ply sheet (with one or more layers), (2) making a second one-ply sheet (with one or more layers) and then (3) bonding the two one-ply sheets together, for example, through thermal, ultrasonic, or adhesive bonding. The one-ply article 100 described herein avoids the costs and complexities of steps (2) and (3) yet performs on par or better than some two-ply sheets as shown in the above Tables.

Figure 4:
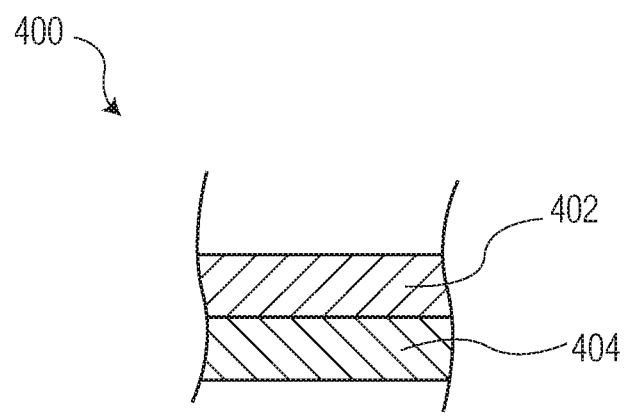
FIG. 4 is an example representation of a cross section of one-ply, two-layer absorbent article.

In some implementations, as shown in FIG. 4, the one-ply absorbent article 400 includes (e.g., only) two layers. Namely, a nonwoven first layer 402 and a nonwoven second layer 404 adjacent (e.g., in at least partial contact with) the first layer 402. The one-ply absorbent article 400 has a first absorbency measure at a first delamination state and a second absorbency measure at a second delamination state. The first absorbency measure is less than the second absorbency measure and the first delamination state is less than the second delamination state. In relevant part the article 400 works similarly to the article 100. The two layers 402, 404 are formed (e.g., foam formed) and/or composed to control the amount of layer-to-layer adhesion and bonding such that the layers partially delaminate in response to certain conditions (e.g., user hand drying), which causes voiding in the layer-to-layer interface thereby resulting in increased absorbency as proven in the above Tables.

Implementations

Implementation 1. A one-ply absorbent article comprising: a nonwoven first layer; a nonwoven third layer; a nonwoven second layer between the first layer and the third layer; and wherein the one-ply absorbent article has a first absorbency measure at a first delamination state and a second absorbency measure at a second delamination state, wherein the first absorbency measure is less than the second absorbency measure and the first delamination state is less than the second delamination state.

Implementation 2. The one-ply absorbent article of implementation 1, wherein at least one of the first layer, the second layer and the third layer are foam formed.

Implementation 3. The one-ply absorbent article of implementation 2 wherein each of the first layer, the second layer and the third layer are foam formed.

Implementation 4. The one-ply absorbent article of any of the preceding implementations, wherein the second layer comprises a debonded cellulosic fiber.

Implementation 5. The one-ply absorbent article of any of the preceding implementations, wherein the first layer comprises a northern softwood pulp.

Implementation 6. The one-ply absorbent article of any of the preceding implementations, wherein the second absorbency measure is about five to thirty-four percent greater than the first absorbency measure.

Implementation 7. The one-ply absorbent article of any of implementations 1-5, wherein the second absorbency measure is about ten to thirty-four percent greater than the first absorbency measure.

Implementation 8. The one-ply absorbent article of any of implementations 1-5, wherein the second absorbency measure is about twenty to thirty percent greater than the first absorbency measure.

Implementation 9. The one-ply absorbent article of any of implementations 1-5, wherein the second absorbency measure is at least ten percent greater than the first absorbency measure.

Implementation 10. A one-ply absorbent article comprising a nonwoven first layer; a nonwoven second layer adjacent the first layer; and wherein the one-ply absorbent article has a first absorbency measure at a first delamination state and a second absorbency measure at a second delamination state, wherein the first absorbency measure is less than the second absorbency measure and the first delamination state is less than the second delamination state.

Implementation 11. The one-ply absorbent article of implementation 10 wherein at least one of the first layer and the second layer are foam formed.

Implementation 12. The one-ply absorbent article of implementation 11 wherein each of the first layer and the second layer are foam formed.

Implementation 13. The one-ply absorbent article of implementation 12, wherein the second absorbency measure is about five to thirty-four percent greater than the first absorbency measure.

Implementation 14. The one-ply absorbent article of any of implementations 10-12, wherein the second absorbency measure is about ten to thirty-four percent greater than the first absorbency measure.

Implementation 15. The one-ply absorbent article of any of implementations 10-12, wherein the second absorbency measure is about twenty to thirty percent greater than the first absorbency measure.

Implementation 16. The one-ply absorbent article of any of implementations 10-12, wherein the second absorbency measure is at least ten percent greater than the first absorbency measure.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed:

1. A one-ply absorbent article comprising:
   a nonwoven first layer comprising cellulosic fibers;
   a nonwoven third layer comprising cellulosic fibers;
   a nonwoven second layer between the first layer and the third layer, wherein the second layer does not include synthetic binder fiber, wherein the nonwoven second layer is treated with a debonding agent, and wherein each of the first layer, the second layer and the third layer are foam formed; and
   wherein the one-ply absorbent article has a first absorbency measure at a first delamination state and a second absorbency measure at a second delamination state, wherein the second absorbency measure is at least ten percent greater than the first absorbency measure and the first delamination state is less than the second delamination state.

2. The one-ply absorbent article of claim 1, wherein the second layer comprises a debonded cellulosic fiber.

3. The one-ply absorbent article of claim 1, wherein the first layer comprises a northern softwood pulp.

4. The one-ply absorbent article of claim 1, wherein the second absorbency measure is about ten to thirty-four percent greater than the first absorbency measure.

5. The one-ply absorbent article of claim 1, wherein the second absorbency measure is about ten to thirty percent greater than the first absorbency measure.

6. The one-ply absorbent article of claim 1, wherein the second absorbency measure is about twenty to thirty percent greater than the first absorbency measure.

7. The one-ply absorbent article of claim 1, wherein the second absorbency measure is at least twenty percent greater than the first absorbency measure.

8. A one-ply absorbent article comprising:
   a nonwoven first layer entirely made from cellulosic fibers;
   a nonwoven second layer adjacent the first layer, wherein the second layer does not include synthetic binder fiber, wherein the nonwoven second layer is treated with a debonding agent, and wherein each of the first layer, the second layer and the third layer are foam formed; and
   wherein the one-ply absorbent article has a first absorbency measure at a first delamination state and a second absorbency measure at a second delamination state, wherein the second absorbency measure is at least ten percent greater than the first absorbency measure and the first delamination state is less than the second delamination state.

9. The one-ply absorbent article of claim 8, wherein the second absorbency measure is about ten to thirty-four percent greater than the first absorbency measure.

10. The one-ply absorbent article of claim 8, wherein the second absorbency measure is about ten to thirty percent greater than the first absorbency measure.

11. The one-ply absorbent article of claim 8, wherein the second absorbency measure is about twenty to thirty percent greater than the first absorbency measure.

12. The one-ply absorbent article of claim 8, wherein the second absorbency measure is at least twenty percent greater than the first absorbency measure.

13. The one-ply absorbent article of claim 1, wherein the cellulosic fibers of at least one of the first and third layers have a Canadian Standard Freeness of at least 200.

14. The one-ply absorbent article of claim 1, wherein the debonding agent comprises a cationic debonding agent.

15. The one-ply absorbent article of claim 1, wherein the debonding agent comprises a quaternary ammonium chloride.

* * * * *